(12) United States Patent
Simske et al.

(10) Patent No.: US 7,543,745 B1
(45) Date of Patent: Jun. 9, 2009

(54) PACKAGE AUTHENTICATION

(75) Inventors: Steven J. Simske, Fort Collins, CO (US); Guillaume Oget, Santa Clara, CA (US); Jorge Badillo, Rincon, PR (US); Bill Serra, Montara, CA (US); Cyril Brignone, Mountain View, CA (US); Malena Mesarina, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 646 days.

(21) Appl. No.: 11/117,796

(22) Filed: Apr. 30, 2005

(51) Int. Cl.
*G06K 5/00* (2006.01)
(52) U.S. Cl. ........................ 235/385; 235/380
(58) Field of Classification Search ................ 235/385, 235/380, 382, 382.5, 383, 375
See application file for complete search history.

(56) References Cited

U.S. PATENT DOCUMENTS 6,788,800 B1 * 9/2004 Carr et al. .................... 382/100
6,880,753 B2 * 4/2005 Ogihara et al. ............. 235/385

FOREIGN PATENT DOCUMENTS

JP 2004157953 A * 6/2004
WO WO 2004100029 A1 * 11/2004

* cited by examiner

*Primary Examiner*—Thien M Le

(57) ABSTRACT

A method of authenticating a package is described. The method includes receiving a read identifier. The read identifier includes information from multiple modes of information storage on a package. Authentication information is provided based on a comparison of the read identifier and one or more stored identifiers.

26 Claims, 6 Drawing Sheets

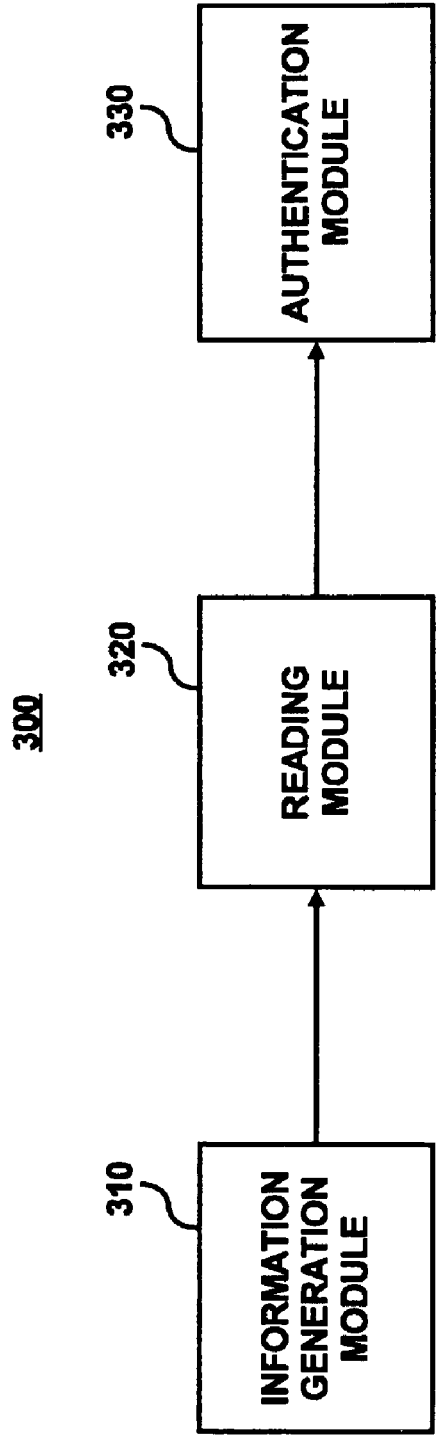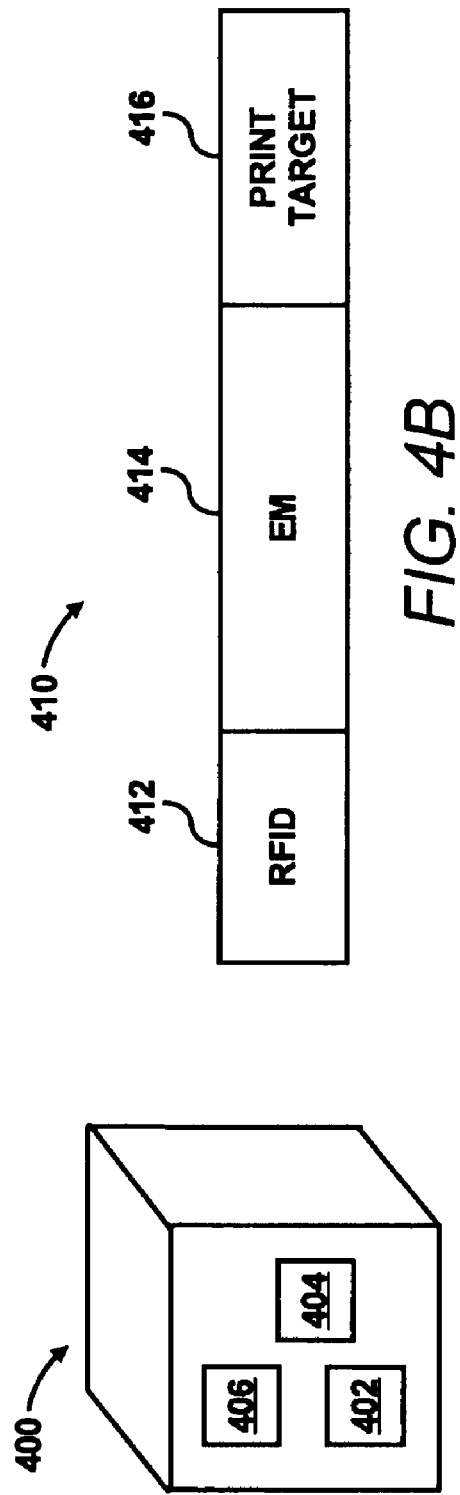

PACKAGE AUTHENTICATION

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeited products may enter the supply chain to the customer at any number of different points in the supply chain. For example, a wholesaler may receive counterfeit goods which it passes on to a retailer, or directly to the customer.

Because of the possibility of spoofing, wherein a counterfeiter copies the packaging of the product, manufacturers attempt to prevent entry of counterfeit products into the marketplace by protecting the packages. Manufacturers can make it difficult for counterfeiters to copy or spoof the packaging on their products. Some approaches that manufacturers have used include using holograms or three dimensional printing on packages. For example, a hologram of a company's logo is placed on a package so a customer buying the product knows that the product is from the company and is not counterfeit. These approaches provide some deterrence. However, counterfeiting has become very sophisticated so that it is has become difficult for manufacturers to provide product packaging that cannot be replicated by counterfeiters of the product.

SUMMARY OF THE INVENTION

A method of authenticating a package is described. The method includes receiving a read identifier. The read identifier includes information from multiple modes of information storage on a package. Authentication information is transmitted based on a comparison of the read identifier and one or more stored identifiers.

BRIEF DESCRIPTION OF THE DRAWINGS

Features of the present invention will become apparent to those skilled in the art from the following description with reference to the figures, in which:

FIG. 3 illustrates an example of an authentication system.

FIG. 4A illustrates an example of a package including multiple modes of information.

FIG. 4B illustrates an example of a package identifier including multiple modes of information.

DETAILED DESCRIPTION OF THE INVENTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system for authenticating packages is described. Identification information may be stored on the package in at least two modes of storage. The at least two modes of storage may include at least two of various types of storage. For example, the at least two modes of storage may include at least two of RFID tags, embedded microprocessors and/or print targets. Although the examples below describe identification information stored in one of each type of storage, in some embodiments, multiple identifications from the same type of storage, such as multiple print targets, instead of or in addition to storing identification information in different mode types.

In one embodiment, a user may authenticate a package by reading all of the identification information from all of the modes of storage on the package and providing the read identification information to a server system. The read identification information may be provided to the server system in the form of a read identifier. The server system may compare the received read identifier to stored identification information stored in a database on the server system. The stored identification is referred to as stored identifiers. If the read identifier matches a stored identifier, the server system sends a message to the user indicating that the package is authentic. If the read identifier does not match a stored identifier, the server system sends a message to the user indicating that the package is not authentic. As used in this specification, "package" may refer to an individual container, a carton or a pallet or any type of receptacle for products on which identification information may be stored.

Figure 1:
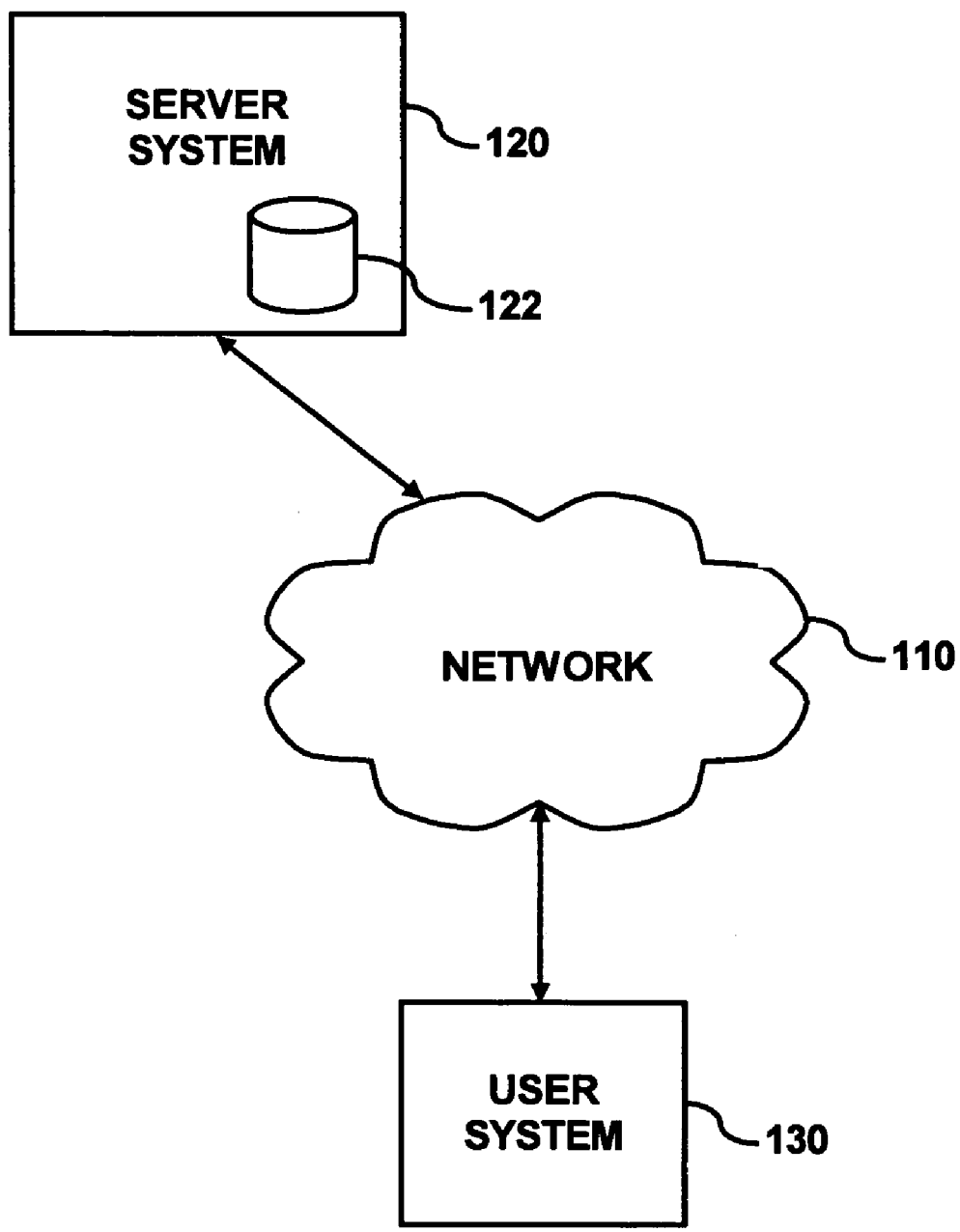
FIG. 1 illustrates an example of an authentication system.

FIG. 1 illustrates a simplified example of a system 100 through which packaging of a product may be authenticated. The system 100 may include a network 110, a server system 120 and a user system 130. The server system 120 and the user system 130 may include any type of computer system, such as the computer system described with reference to FIG. 7. The server system 120 may include serving software (not shown) to communicate with other systems connected to the server system 120 through the network 110. The server system 120 may also include a database 122 to store information with which the server system 120 may authenticate packages. The network 110 may include any type of network, including a LAN, a WAN, the Internet, etc.

In the system 100, a user system 130 may send package information regarding read features of a package to a server system 120 via the network 110. The server system 120 compares the received information to information stored in a database 122. The server system 120 transmits a message indicating that the package is authentic or informing the user system 130 that the package may not be authentic via the network 110. The message transmitted by the server system 120 may include a message sent to the user's browser or an email or other type of message.

Figure 2:
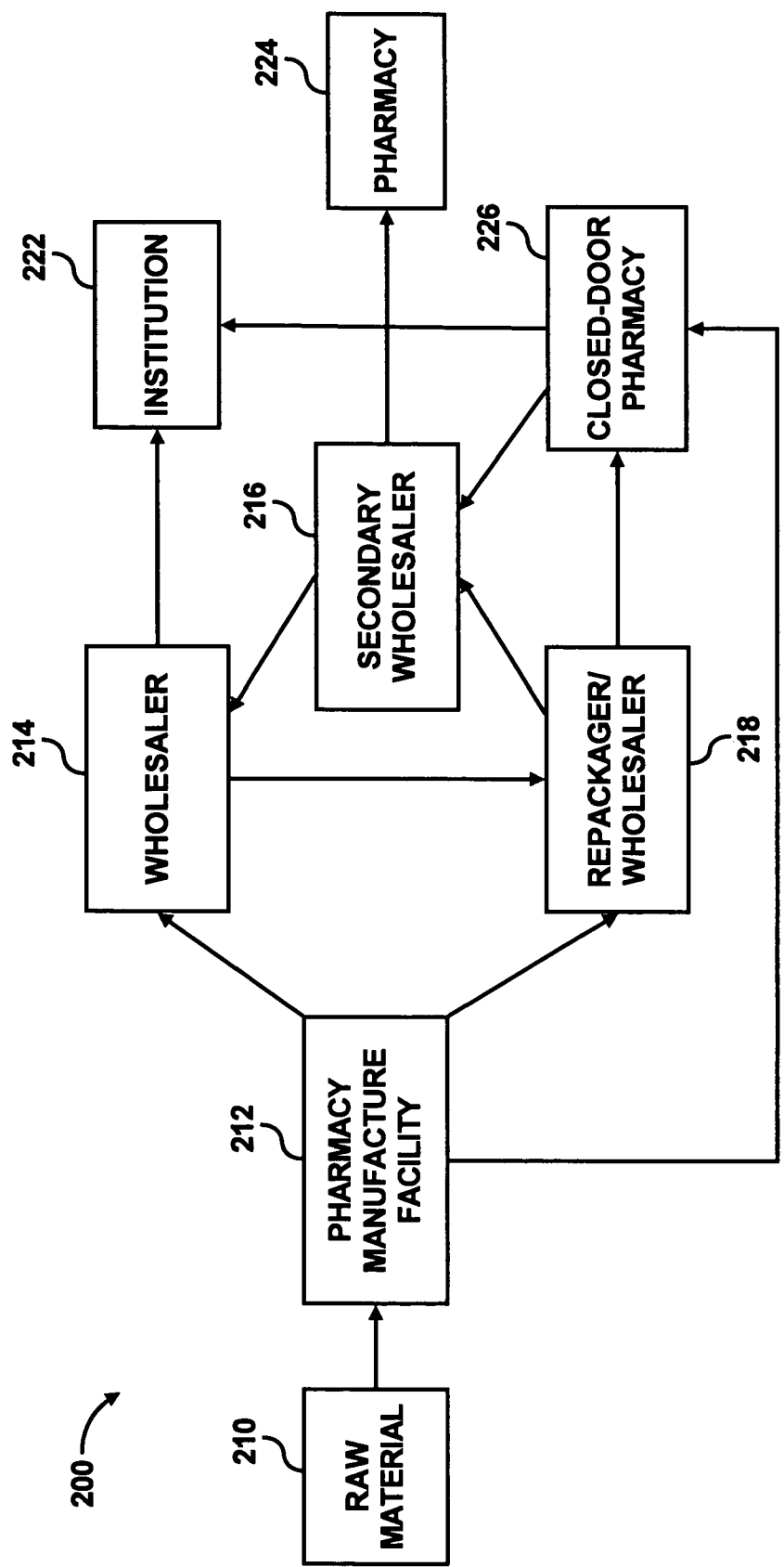
FIG. 2 illustrates an example of a supply chain in which an authentication system may be used.

The system 100 may be used to authenticate any type of product at any point of a supply chain, from the manufacturer to the customer. As an example, FIG. 2 illustrates a pharmaceutical supply chain and use of the authentication system in FIG. 1 in the pharmaceutical supply chain. It will be apparent that the authentication system can be used in supply chains for many product types.

FIG. 2 illustrates a simplified example of a supply chain 200 for the sale of pharmaceutical ("pharma") products. As shown in FIG. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or pharmacies 224, which sell the pharma products to individual customers. The wholesaler 214 may also send some or its received pharma products to the repackager/wholesaler 218.

The repackager/wholesaler 218 may sell the pharma products to closed-door pharmacies 226. The closed door pharmacies 226 sell the pharma products to institutions 222, such as hospitals, nursing homes or hospices. The PMF 212 may also directly provide pharma products to the closed-door pharmacies 226.

Problems with counterfeit goods may arise with a network of secondary wholesalers 216. Some of the pharma products received by the repackager/wholesalers 218 or closed-door pharmacies 226 may end up at the secondary wholesalers 216, who may sell the pharma products at highly discounted prices to pharmacies 224. The secondary wholesalers 216 may sell some of the pharma products to the wholesalers 214.

Due to the number of entities handling the pharma products as they progress through the supply chain, pharmacies 224 and institutions 222 may receive counterfeit pharma products. For example, secondary wholesalers 216 may receive counterfeit products, which the secondary wholesalers 217 may sell to pharmacies 224 or wholesalers 214, introducing the counterfeit products into the supply chain. Counterfeit pharma products may include pharma products that have been reimported into the country from abroad, i.e., a process termed diversion, pharma products that have expired but the expiry dates have been changed on the packaging, i.e., a process called alteration, or pharma products not manufactured by the PMF 212 that are packaged in packaging designed to spoof the packaging of actual pharma products.

The authentication system 100 in FIG. 1 may be used in the supply chain 200 to authenticate pharma products produced by the PMF 212. The server system 120 used to authenticate the pharma products may be administered by the PMF 212 or administered by an agent of the PMF 212. The user system 130 may be located at any of the other locations in the supply chain 200, including the institution 222, the pharmacies 224, closed-door pharmacies 226, the wholesaler(s) 214, repackager/wholesaler(s) 218 or secondary wholesaler(s) 216. Also, the user system 130 may be located outside of the supply chain, such as at a user's residence.

FIG. 3 illustrates a simplified embodiment of a system 300 for authenticating products, including, but not limited to, pharma products. At the information generation module 310, identification information is generated for a package. The information generation module 310 may be located at the PMF 212 shown in FIG. 2. The identification information generated may be generated on a per container basis, a per carton basis or a per pallet basis. There may be 20-30 containers per carton and about 500 or more cartons per pallet, however, the number of containers per carton and the number of cartons per pallet may vary.

The identification information may include information that is stored in multiple modes of storage. For example, the identification information may include information stored in a radio frequency identification ("RFID") tag, information stored in a print target and information stored in a microprocessor embedded in the package, forensic methods using chemical taggants, among other means. The identification information may be encrypted and stored as a stored identifier in the database 122, shown in FIG. 1.

At the reading module 320, the package is read to identify the information stored in the multiple modes of information storage on the package. The reading module 320 may be part of the user system 130. The reading module 320 may be located at any point in the supply chain, or outside of the supply chain, where products may be authenticated.

The reading module may include one or more of a RFID reader for reading RFID tags, a digital camera or scanner for reading print targets, an embedded microprocessor reader for reading information stored in the embedded microprocessor, and a multimode reader able to read two or more of RFID tags, print targets, and embedded microprocessors.

The read information may then be encrypted and transmitted as a read identifier to the authentication module 330 for authentication. The user system 130 may be used to provide the read identifier to the authentication module 330.

The authentication module 330 may be part of the server system 120. The authentication module 330 may be located at the PMF 212, shown in FIG. 2, or any agent of the PMF 212. The authentication module 330 may receive the read identifier and compare it to the stored identifier stored in the database 122 of the server system 120. The authentication module may provide a message to the user system 130 indicating whether the package is authentic or not authentic.

FIG. 4A illustrates an embodiment of a package 400 including identification information. The identification information may include information stored in two or more modes of information storage on the package. The identification information may be stored in any of a radio frequency identification ("RFID") tag 402, a print target 406, and an embedded microprocessor ("EM") 404, among other means.

A RFID tag 402 uses radio frequency technology to transmit information stored in the RFID tag 402. For example, the RFID tag 402 may include an integrated circuit and an antenna. The RFID tag preferably includes a passive RFID tag (not using an internal power source such as a battery). However, an active RFID tag (using an internal power source, such as a battery) may be used. The RFID tag 402 may be read by a RFID reader (not shown). The RFID reader may generate a magnetic field for interrogating the tag 402 using an antenna, which may include an inductive element. The magnetic field induces an energizing signal for powering the tag 402 via the antenna. When powered the RFID tag 402 generates a signal which may include information associated with the package 400. The signal is modulated using a know modulation scheme and transmitted to the RFID reader.

A RFID tag 402 typically stores 96 bits of information. The RFID tag 402 may be read or written to from distances of up to 20 feet, and is not required to be in the line of sight of the RFID reader to be read. The RFID tag may be affixed onto the package 400 prior to, during, or after a process of printing information on the material used to form the package 400 or on material affixed to the package 400.

A print target 406 may include a printed pattern such as a pattern including colors in varying positions. The pattern may include visible patterns, ultraviolet patterns, or infrared patterns. The print target 406 may be printed onto the package 400 as part of a process to print information on the material used to form the package 400.

An EM 404 may include a microprocessor that is embedded into the package. The EM 404 may include an embedded microprocessor with an associated memory. The EM 404 usually may be read or written to only from a close distance. The EM 404 may be printed onto the package 400 using a printer configured to print microprocessors onto package material. The EM 404 may also be embedded in the package material prior to the process of printing information on the package material.

Note, the RFID may be polled separately at the pallet level, allowing normal RFID-based "track and trace" to occur, as well as for final authentication. The additional modes of print targets and EM can be used for final authentication allowing the embodiments herein to accommodate and extend current methods.

FIG. 4B illustrates an example of an identifier 410 including identification information. The identifier 410 may be the same as the read identifier or the stored identifier. The identifier 410 may include information stored in two or more modes of information storage on the package 400. The identifier 410 may include encrypted information based on the information stored in the two or more modes of information storage. In the example shown in FIG. 4B, the identifier 410 includes three modes of information. In this example, the information may include RFID information 412 stored in a RFID tag 402 and print target information 416 stored in a print target 406. The information may also include a third mode of information 414, such as information stored in an EM 404. The identifier 410 may be generated during printing of the package.

The RFID tag information 402 may include identification information generated by a random number generator. The RFID tag information may be encrypted and stored in the identifier. The RFID tag information may be configured to have a size of 96 bits.

The print target information 406 may be generated by reading the package. In one example, the encrypted print target information has a size of 8 bits. The print target information may include one or more of color, watermark(s), visible patterns, ultraviolet features, infrared features or any feature that may be read or read. For example, if the colors include cyan, magenta, yellow, red, green, and blue, a pattern that included four different arrangements of the six colors would generate $6^4$ or 1296 possibilities for variability of pattern.

The information stored in the embedded microprocessor may be generated by a random number generator. The EM information may have a size of M bits, where M may be set to be any number of bits. For example, M may be set to be about 3200 bits. Generally, the number of bits of EM information can be very large, depending on the size of the EMs available. For example, EM's may be available that are be 1-2 Mbyte, or 20 megabit, or larger.

The identifier 410 may be generated so that only $10^5$ of $10^{1000}$ possible combinations of the identification information stored in the multiple modes of information storage are valid. Thus, 1 in $10^{995}$ combinations will be valid, making it difficult for the combination to be spoofed by counterfeiters. Also, if the RFID information and the embedded microprocessor information were somehow spoofed, a scan of the package itself would still be necessary to complete authentication, adding another layer of security. Different approaches may be used from one lot to the next. For example, two or more of the modes can be made to share the same information for one run and two different modes to share the information in the next run, and so on. In examples, one mode may store the 0's or 1's complement of another mode, or the third mode may serve as a "key" to translate the other two modes into matching information, and so on. Thus, there is additional variability in how the information in the different indicia relate to one another.

Thus, in one example, with reference to FIGS. 4A and 4B, the identification information stored in the RFID tag 402, the EM 404, and the print target 406 may represent the same code. For example, the code "97" may be encrypted into a 96 bit RFID identifier 412 to be stored in the RFID tag and encrypted into a M bit EM identifier 414 to be stored in the EM 404 and translated into a pattern or sequence of colors representing the number 97 to be stored as the print target information 416. The identification information stored in each of the modes of information storage, RFID tag 402, the EM 404, and the print target 406 may also include information that is different from the identification information stored in the other modes of information storage.

Figure 5:
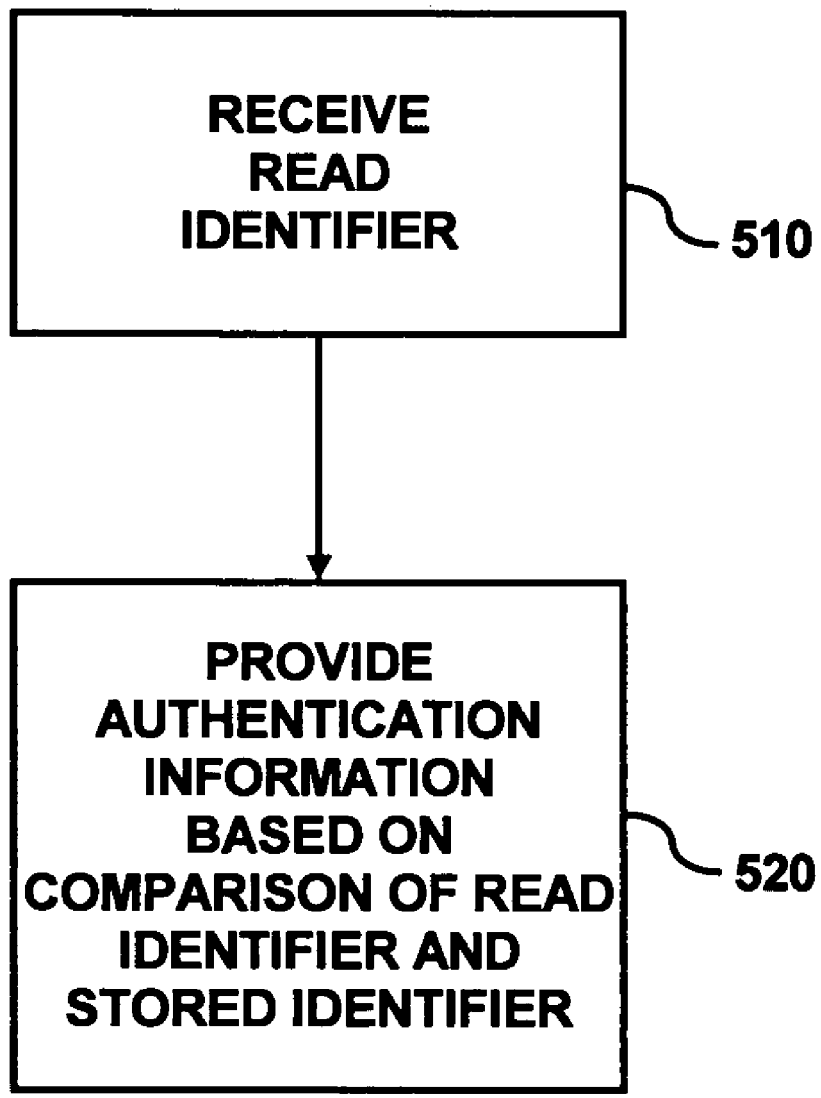
FIG. 5 illustrates an example of a method of authenticating a package.

FIG. 5 illustrates a method of authenticating a package. At step 510, read information may be received in the server system 120 from the user system 130 shown in FIG. 1. The read information may include a read identifier for the package, such as the identifier 410 shown in FIG. 4. The read identifier may include read identification information, such as read RFID information 412, read EM information 414, and read print target information 416.

The user system 130 may aggregate the read information (examples of which include convolution, multiplication, concatenation, etc.), and may provide the read information to the server system 120 as a read identifier. The read identifier may include encrypted information. For example, in one embodiment, the RFID information 412, the EM information 416, and/or the print target information may be each be encrypted and aggregated to form the read identifier. In other embodiments, the RFID information 412, the EM information 416 and the print target information may be aggregated and then encrypted to form the read identifier.

The transmission of the read identifier may include a secure transmission so that system 130 may authenticate system 120, and so that the transmission through the network 120 may not be eavesdropped. An example of how to implement a secure transmission may include usage of public key cryptography, and may require authentication and integrity validation of the system 120 public key (which may be achieved, for example, through the use of a digital certificate). The encryption key may be stored in the microprocessor of the reading device, uploaded from a secure website, or use any other common RSA-type key distribution mechanism. The encryption key may also be part of information stored in one or more of the multiple modes of information storage 402, 404, 406.

The server system 120 may compare the received read identifier to one or more stored identifiers which are stored in the database 122 shown in FIG. 1. If the stored identifiers are stored in encrypted form, the server system 120 may compare the received read identifier to the stored identifiers. If the identifier stored in the database 122 is not stored as in encrypted form, the server system 120 may decrypt the received read identifier and compare the decrypted received read identifier to the stored identifiers. A comparison of the read identifier to one or more stored identifiers may include a comparison of either encrypted or decrypted identifiers.

At step 520, the server system 120 may provide authentication information based on a comparison of the read identifier and stored identifiers. The authentication information may include an authentication message. Providing the authentication information may include transmitting the authentication message, for example, from a servers system 120 to a user system 130.

If the received read identifier matches a stored identifier, an authentication message indicating that the read identifier represents an authentic package may be provided. If the received read identifier does not match a stored identifier, an authentication message indicating that the read identifier does not represent an authentic package may be provided. The authentication message may include an email or a message displayed on a web page viewable in a web browser of the user system 130, where the web page is part of a website administered by the server system 120.

The server system 120 may purge stored identifiers from the database 122 for packages including products which have expired (or have been authenticated elsewhere). The server system 120 may purge each stored identifier at the date of expiry of the product in the package to ensure that expired products are not authenticated by the server system 120.

Steps 510 and 520 of the above method may be performed in the authentication module 330 shown in FIG. 3.

The method of FIG. 5 may also include generating identification information to be stored in multiple modes of information storage for a package 400. Generation of the identification information may be performed in the information generation module 310. The identification information to be stored as multiple modes of information storage may include one or more of identification information to be stored in a RFID tag 402, identification information to be stored in an EM 404, and identification information to be stored as a print target 406.

As described above, a random number generator may be used to generate a number which is encrypted into 96 bits to form the RFID information 412. A random number generator may be used to generate a number which is encrypted into M bits to form the EM information 414. The print target information 416 may be translated into colors or patterns from a number generated by a random number generator. In one embodiment, each of the multiple modes of information, RFID information 412, EM information 414 and print target information 416, may be formed from the same number or code.

The encrypted 96 bit RFID information 412, encrypted M bit EM information 414 and print target information 416 may be aggregated to form a package identifier 410. The package identifier 410 may be stored in a database 122 of a server system 120 as a stored identifier.

Figure 6:
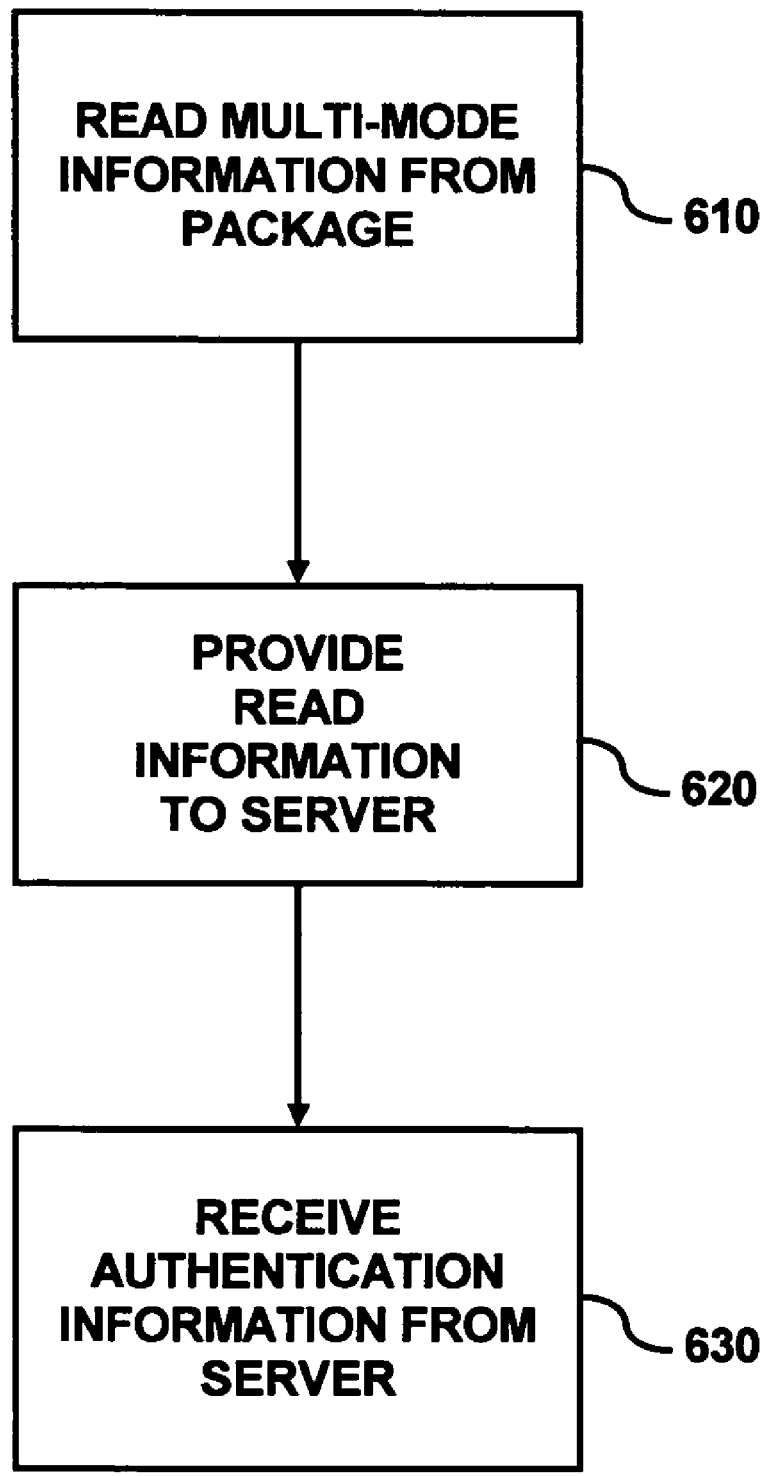
FIG. 6 illustrates an example of a method of receiving package authentication information.

FIG. 6 is an embodiment of a method of checking authenticity of a package. At step 610, a package 400 is read to obtain two or modes of identification information. The package 400 may be read by two or more readers, each capable or reading information from one or more types of information storage, or by a single multi-modal reader.

Following the example shown in FIGS. 4A and 4B, three modes of information on the package 400 may be read—RFID information 412, EM information 414, and print target information 416. The RFID information 412 may be read using a RFID reader. The EM information 414 may be read using a EM reader. The print target information 416 may be read using a digital scanner or camera. Other methods may include forensics taggants, bubble distributions, and so on, which are capable of being authenticated.

The read information may be encrypted and aggregated to form a read identifier. The read identifier may include read information that has been aggregated and then encrypted or encrypted and then aggregated. Each mode of read information may be encrypted separately or the aggregated read information may be encrypted together as a unit.

As described above, with reference to FIG. 5, the user system 130 may provide the read identifier to the server system 120. Providing the read information may include transmitting the read identifier may include transmitting the read identifier to the server system 120. Transmitting the read identifier may include transmitting the read identifier using secure communication to transmit the read identifier so that system 130 may authenticate system 120 and so that the communication through the network 120 may not be eavesdropped.

At step 620, the read identifier is transmitted through a user system 130 to the server system 120. The read identifier may be transmitted in an email message or entered through a web page of a web site administered by the server system 120.

At step 630, the user system 130 may receive authentication information from the server system 120. The authentication information may include an authentication message. For example, the authentication information may include either a message indicating that the package 400 is authentic or a message indicating that the package 400 may not be authentic based on the provided read identifier. The message may include an email or a message displayed on a web page viewable in a web browser of the user system 130, where the web page is part of the website through which the user system 130 provided the read identifier to the server system 120.

The steps described with respect to FIG. 6 may be performed in the reading module 320. The reading module 320 may be part of the user system 130.

Figure 7:
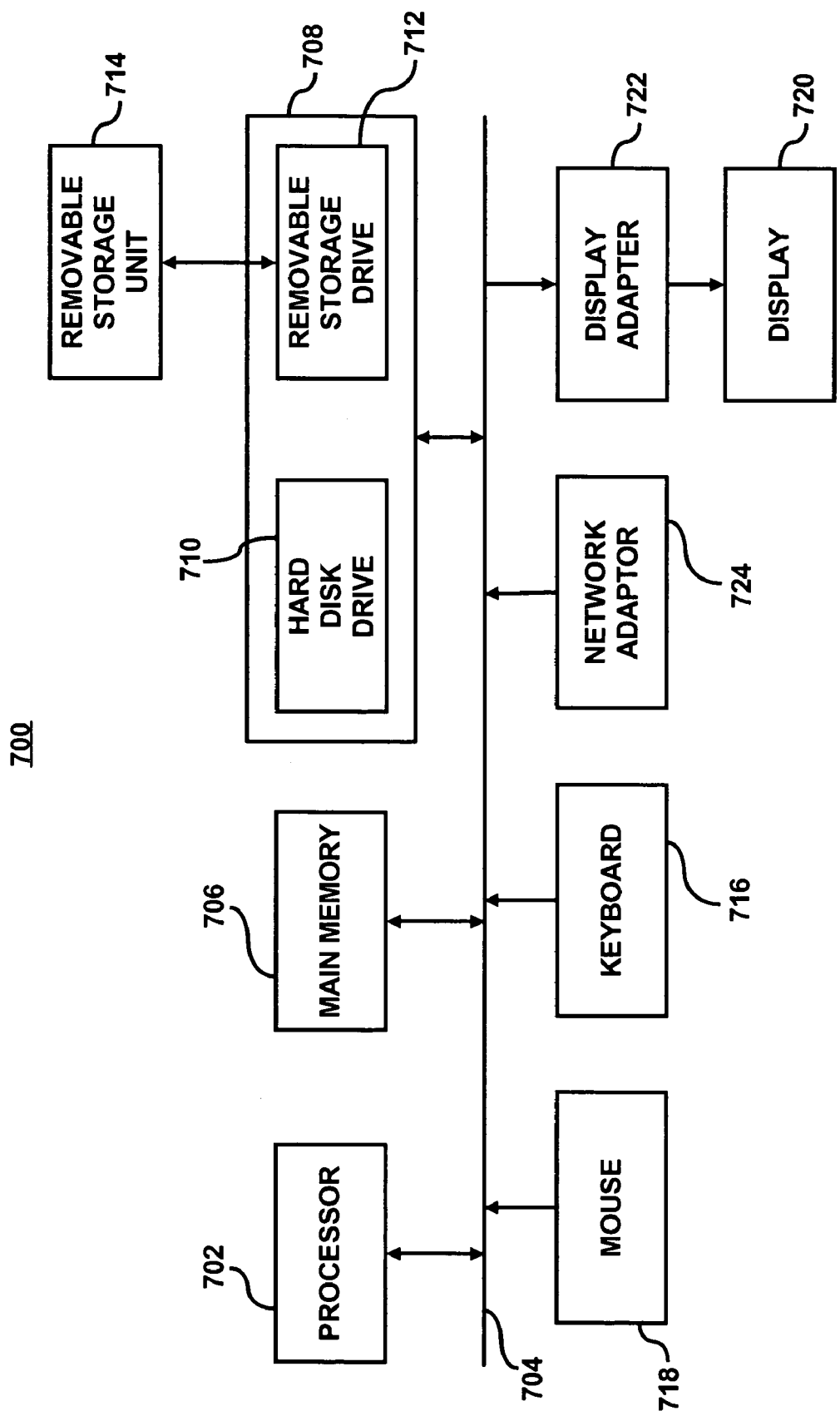
FIG. 7 is a block diagram illustrating a computer system operable to perform the method depicted in FIGS. 5 and 6.

FIG. 7 illustrates an embodiment of a computer system 700 operable to control the package authentication process described with respect to the methods 500 and 600. In this respect, the computer system 700 may be used as a platform for executing one or more of the functions described hereinabove with respect to the various steps outlined in the methods 500 and 600.

The computer system 700 includes one or more controllers, such as a processor 702. The processor 702 may be used to execute some or all of the steps described in the methods 500 and 600. Commands and data from the processor 702 are communicated over a communication bus 704. The computer system 700 also includes a main memory 706, such as a random access memory (RAM), where a program code may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the method 400 may be stored.

The removable storage drive 712 reads from and/or writes to a removable storage unit 714 in a well-known manner. User input and output devices may include a keyboard 716, a mouse 718, and a display 720. A display adapter 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of authenticating a package, the method comprising:
storing identification information in multiple modes of information storage on the package, wherein storing the identification information includes storing information in a first mode of storage, storing, in a second mode of storage, the information stored in the first mode of storage, and storing, in a third mode of storage, information usable as a key to translate the information stored in the first mode of storage;
receiving a read identifier, the read identifier including the identification information in the multiple modes of information storage on the package; and
providing authentication information based on a comparison of the read identifier and one or more stored identifiers.

2. The method of claim 1, further comprising:
aggregating the identification information stored in the multiple modes of information storage into a package identifier.

3. The method of claim 2, wherein aggregating the identification information stored in the multiple modes of information storage into a package identifier further comprises:
encrypting information from one or more modes of the multiple modes of information storage.

4. The method of claim 3, further comprising storing an encryption key in at least one of the multiple modes of storage.

5. The method of claim 2, further comprising storing the package identifier as one of the stored identifiers.

6. The method of claim 1, further comprising:
generating the identification information to be stored in at least one of the multiple modes of information storage using a random number generator.

7. The method of claim 1, wherein storing the identification information in the multiple modes of information storage includes selecting a combination of information to be stored in the multiple modes of information storage from $10^5$ combinations of identification information for storing in the multiple modes of information storage, wherein $10^{1000}$ combinations of identification information are possible for each combination of the multiple modes of information storage.

8. The method of claim 1, wherein storing the identification information in the multiple modes of information storage on one or more packages comprises storing a particular combination of the identification information in the multiple modes of identification storage on a group of containers.

9. The method of claim 1, wherein storing the identification information in the multiple modes of information storage includes storing identification information in at least one of a radio frequency identification ("RFID") tag, an embedded microprocessor including extended memory, and a print target.

10. The method of claim 1, wherein storing the identification information in the multiple modes of information storage comprises storing identification information in a RFID tag, wherein the RFID tag is usable to track the package.

11. The method of claim 1, wherein storing the identification information in the multiple modes of information storage includes storing the same identification information on the package in the multiple modes of information storage.

12. The method of claim 1, further comprising:
comparing the received read identifier to the one or more stored identifiers to determine if the package from which the received read identifier was read is authentic.

13. The method of claim 12, further comprising:
decrypting the received read identifier to compare the received read identifier to the one or more stored identifiers.

14. The method of claim 1, wherein the read identifier includes encrypted read information from one or more of the multiple modes of information storage on the package.

15. The method of claim 1, wherein providing the authentication information comprises providing a message indicating that the package is authentic if the received read identifier matches one of the one or more stored identifiers.

16. The method of claim 1, wherein providing the authentication information comprises providing a message indicating that the package may not be authentic if the received read identifier does not match one of the one or more stored identifiers.

17. The method of claim 1, wherein providing the authentication information comprises providing one of an email or a web page including the authentication information to the user system.

18. The method of claim 1, further comprising removing at least one of the one or more stored identifiers from a database in response to passing an expiration date associated with the at least one of the one or more stored identifiers.

19. A method of authenticating packages, the method comprising:
reading a package to obtain identification information from multiple modes of information storage on the package;
encrypting a read identifier associated with the read identification information by using an encryption key stored on the package;
providing the read identifier to a server; and
receiving authentication information from the server indicating whether the package is authentic.

20. The method of claim 19, wherein providing the read identifier comprises aggregating the identification information read from the multiple modes of information storage into the read identifier.

21. The method of claim 19, wherein receiving the authentication information comprises receiving one of an email or a web page including the authentication information from the server system.

22. The method of claim 19, wherein reading the package comprises at least one of reading one or more modes of the multiple modes of information storage using a reader specific to one type of information storage and reading two or more modes of the multiple modes of information storage together using a reader configured to read two or more types of the information storage.

23. A system for authenticating packages, the system comprising:
an information generation module configured to generate identification information to be stored in two or more modes of information storage, store the identification information in the multiple modes of information storage on one or more produced packages, and store a combination of the identification information stored in the multiple modes of information storage as stored identifiers to be used to authenticate packages, wherein storing the identification information in the multiple modes of information storage includes storing information in a first mode of storage, storing, in a second mode of storage, the information stored in the first mode of storage, and storing, in a third mode of storage, information usable as a key to translate the information stored in the first mode of storage; and a reading module configured to read a package to obtain identification information stored in multiple modes of information storage, form a read identifier by aggregating the read identification information and provide the read identifier to an authentication module for authentication.

24. The system of claim 23, further comprising:

an authentication module configured to authenticate a package by comparing the read identifier to the stored identifiers.

25. A computer readable storage medium on which is embedded one or more computer programs, said one or more computer programs implementing a method of authenticating packages, said one or more computer programs comprising a set of instructions for:

reading a package to obtain identification information from multiple modes of information storage on the package;

encrypting a read identifier associated with the read identification information by using an encryption key stored on the package;

providing the read identifier to a server; and receiving authentication information from the server indicating whether the package is authentic.

26. The computer readable storage medium of claim 25, wherein the set of instructions for providing the read identifier comprises a set of instructions for:

aggregating the identification information read from the multiple modes of information storage into the read identifier.

\* \* \* \* \*

UNITED STATES PATENT AND TRADEMARK OFFICE
CERTIFICATE OF CORRECTION

PATENT NO.        : 7,543,745 B1                                     Page 1 of 1
APPLICATION NO.   : 11/117796
DATED             : June 9, 2009
INVENTOR(S)       : Steven J. Simske et al.

It is certified that error appears in the above-identified patent and that said Letters Patent is hereby corrected as shown below:

In column 3, line 8, delete "or" and insert -- of --, therefor.

Signed and Sealed this

Fifth Day of January, 2010

David J. Kappos
*Director of the United States Patent and Trademark Office*